Figure 1:
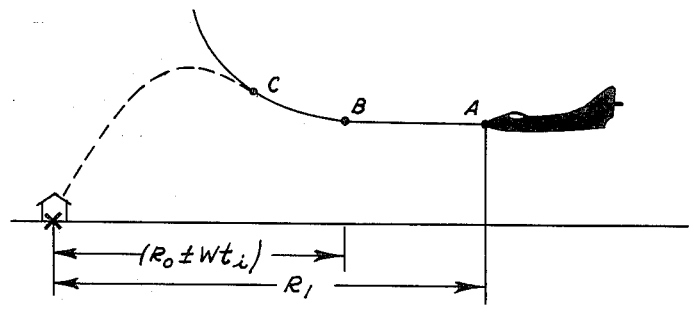

May 7, 1963    P. L. BRINK ET AL    3,088,372
LOW LEVEL MEANS OF WEAPON DELIVERY
Filed Oct. 9, 1958

INVENTOR.
PAUL L. BRINK
CLARE D. McGILLEM
BY
H. H. Losch
ATTORNEYS

United States Patent Office 3,088,372
Patented May 7, 1963

3,088,372
LOW LEVEL MEANS OF WEAPON DELIVERY
Paul L. Brink, Indianapolis, Ind., and Clare D. McGillem, Flint, Mich., assignors to the United States of America as represented by the Secretary of the Navy
Filed Oct. 9, 1958, Ser. No. 766,366
2 Claims. (Cl. 89—1.5)
(Granted under Title 35, U.S. Code (1952), sec. 266)

The invention described herein may be manufactured and used by or for the Government of the United States of America for governmental purposes without the payment of any royalties thereon or therefor.

This invention relates generally to a system for weapon delivery by aircraft to ground targets and more particularly to weapon delivery by aircraft flying at low level with release of the weapons accomplished during pull-up from level flight path. The invention uses means comprising a radar ranging system, a variable time computer, and an armament control system to enable the pilot to achieve certain prechosen conditions for weapon delivery.

Prior methods for weapon delivery from low flying aircraft to ground targets have usually been of two types. In one type the timing of delivery was based on use of a geographic base point, hereafter referred to as an initial point, and it was located at a fixed and known distance from the target. The approach to the target was made by passing over the initial point at low altitude and in a direct line toward the target. At the time of passing over the initial point, a time measuring circuit was placed in operation. At the expiration of a fixed and preselected time from this moment, the pilot was signalled by either a warning light or an audible tone to initiate a pull-up of the aircraft. A standard pull-up maneuver was executed and the weapons were released automatically when the flight path of the aircraft reached a preselected angle to the horizon. The second method involved execution of a shallow dive upon the target during which an air-to-ground ranging radar was used to measure the range to the target. When the range so measured reached a preselected pull-up range, the pilot was alerted by either a light or an audible signal to begin pull-up of the aircraft. During a standard pull-up of the aircraft, the weapons were released at the required instant. The former method had the following disadvantages: (a) a suitable geographic initial point may not exist, for example, if the approach were made over water toward a coastal target; (b) an initial point obvious enough to be readily recognizable by the pilot might be as easily recognizable to the enemy and therefore well defended; (c) a suitable initial point might require a disadvantageous direction of approach to the target; (d) without using elaborate sighting devices it is difficult for the pilot to know when he is precisely over or adjacent to initial point; (e) atmospheric conditions may make the initial point unrecognizable; and (f) atmospheric conditions may require approach to be made at such height that only a crude determination of the time of passing of the initial point would be possible. Disadvantages of the second method are that, (a) prior to the dive toward the target, the approach must be made at a relatively high altitude which reduces the possibility of an undetected approach; and (b) certain of the prechosen approach conditions required to execute this method are harder to meet than those associated with a level approach to the target; for example, the angle of dive and the speed of the aircraft during dive are hard to control with the required accuracy.

The means constituting the present invention provide for a low altitude and level flight approach to the target, range measurement by a ranging device at an instant selectable at the pilot's discretion, using this range measurement with information representing prechosen conditions of weapon delivery in an automatic computation to provide notification of the pilot at the correct moment after the selected instant that he should commence a pull-up maneuver, and automatic release of weapons at the proper place during pull-up. The means constituting this invention avoid the difficulties encountered in the earlier methods of weapon release by allowing a low and level approach to the target without resorting to the use of a geographic initial point, permitting better control of the aircraft and affording less opportunity for the enemy to provide adequate defense measures.

It is therefore a general object of this invention to provide a means whereby weapons can be delivered from an aircraft to the ground without reference to any geographic point except the target itself.

It is a further object of this invention to provide a means whereby weapons can be delivered from an aircraft to the ground in which the approach by the aircraft to the target can be made at a low level and thereby lend a measure of safety to the aircraft during the approach.

It is an additional object of this invention to accomplish the other objects with a minimum of information, either measured or computed in the attack.

Figure 2:
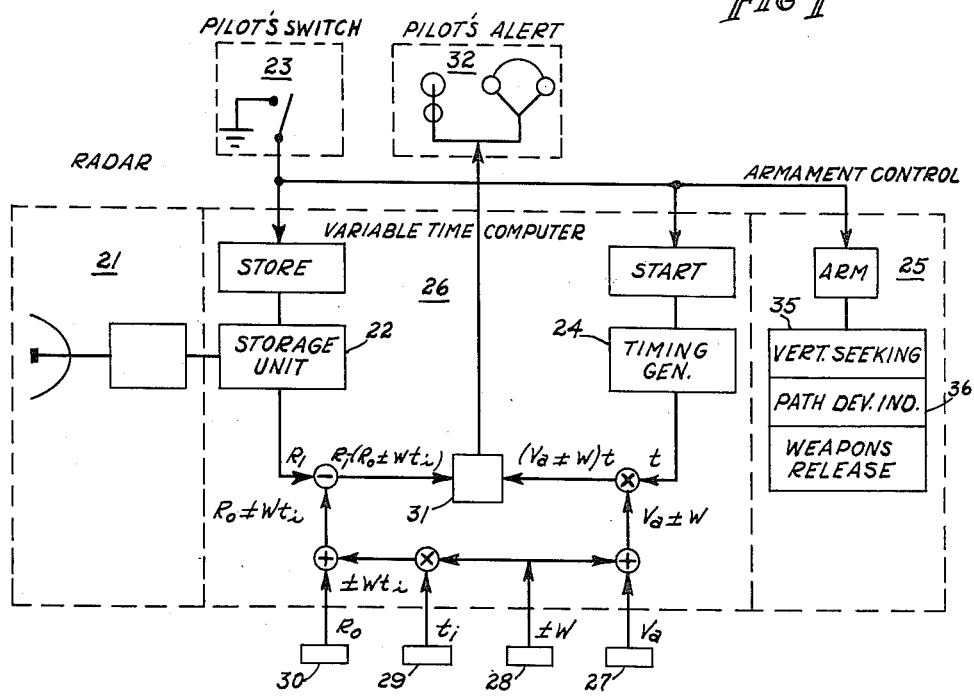

Other objects and uses of the invention will be apparent when the invention is studied with reference made to the drawing in which:

FIGURE 1 shows schematically the relationship of the aircraft to the target during the attack, and FIGURE 2 shows the combination of the equipment which enables the procedure established by this invention to be accomplished.

The operation of the invention will be described in connection with the means by which the operation is accomplished. During approach to the target, the aircraft flies level at a low altitude. At a preselected distance from the target, a standard prespecified pull-up maneuver is executed until the flight path of the aircraft is at a prespecified angle to the horizon at which point the weapons are automatically released. So the pilot will know when to begin the pull-up maneuver, the equipment used in the present invention measures the range at an arbitrary point, point A in FIGURE 1, selected by the pilot, and then, based on the range at that point and the approach air speed, it determines when enough time has elapsed for the aircraft to reach the pull-up point, B in FIGURE 1. It then alerts the pilot by visual or audible means.

In making the time determination, computations are based on prechosen conditions for weapon delivery and on the range at the point arbitrarily selected by the pilot. Referring to the variable time computer of FIGURE 2, the prechosen conditions of preselected no-wind pull-up range $R_0$, the precalculated time from pull-up to weapon impact $t_i$, the preselected run-in air speed $V_a$, and the preknown wind velocity in the range direction W are entered for inclusion in the computations, by the handset controls, such as the knobs 30, 29, 28, and 27, which may operate potentiometers to establish voltage levels representative of this information. The range $R_1$ at the arbitrary point A selected by the pilot is measured by the radar 21 and is caused by operation of the pilot's switch 23 to be stored in the storage unit 22, which may be a capacitor. At the same time, the pilot's switch causes the timing generator 24, which may be a capacitive integrating circuit, to begin to produce a quantity which changes linearly with elapse of time from the moment of actuation of the pilot's switch. The pilot's switch also prepares the armament control system 25 so that it can release the weapons at the proper point after pull-up. It should be noted that the range measured by the radar at the arbitrary point A is actually slant range and not ground range; but because of the low altitude by comparison with the distance, the difference between slant range and ground range is negligible, so hereafter the two will be considered the same and represented by $R_1$.

The operations performed in the computer are indicated by the operation signs in the circles of FIGURE 2. The preselected run-in air speed $V_a$ is added to preknown wind velocity $\pm W$ in the range direction, to give the quantity $V_a \pm W$ which represents the ground speed of the aircraft. This quantity is multiplied by the time $t$ elapsed since the aircraft passed point A in FIGURE 1 to give the product $$(V_a \pm W)t$$

which represents the distance the aircraft has moved from point A at any time $t$. The wind velocity is also multiplied by the precalculated time $t_1$ it would take between the pull-up of the aircraft and the impact of the weapons if there were no wind in the range direction, to give the product $$\pm Wt_1$$

which represents the distance the air mass trajectory of the aircraft during pull-up and the weapon during fall is displaced due to wind. This product $$\pm Wt_1$$

is then added to the preselected pull-up range $R_0$ to give the quantity $$R_0 \pm Wt_1$$

which represents the actual range to the target at which pull-up should begin, taking into account the wind effect. This quantity is then subtracted from the range $R_1$, which was stored at the time the pilot selected, to give the ground distance $$[R_1 - (R_0 \pm Wt_1)]$$

which the aircraft must travel before pull-up begins. This distance is from A to B in FIGURE 1. A voltage comparator 31 of the computer compares this value with the constantly changing value of $$(V_a \pm W)t$$

so that when $$(V_a \pm W)t$$

equals $$R_1 - (R_0 \pm Wt_1)$$

a signal is produced to cause the pilot's alert 32 to notify the pilot that the place for pull-up has been reached. The computations performed in the computer can be accomplished by any of the well known circuitry suitable therefor.

After the pilot's alert is actuated, he will commence the pull-up maneuver and during the pull-up maneuver a vertical seeking unit, such as a vertical gyro 35, and a path deviation indicator, such as a directional gyro 36, will cooperate in the armament control system 25 to cause release of the weapons when the aircraft has assumed the necessary flight path.

There are several ways in which the selection may be made of the time at which the pilot's switch is operated. They depend on the type of sighting used, but, in any case, the sighting device used by the pilot is aligned with the boresight axis of the radar antenna.

In one system arrangement the radar and sight are fixed with respect to the aircraft and are depressed downward at a fixed angle from the flight direction. The depression angle is chosen such that the radar energy will strike the ground at a sufficient angle of incidence to reflect the amount of energy needed to detect and measure the range. The angle at which the radar and sight are depressed is adjustable so that the value most suitable for a given delivery can be employed. The requisite depression angle in turn defines the minimum altitude at which the approach must be made. When the radar and sight are fixed to the aircraft, as the aircraft approaches the target, if perfectly level flight were maintained, the radar and sight axes would fall upon the target at just one instant, and at this point the range to target would be measured. However, perfectly level flight will not be possible because of air turbulence and normal flight control errors; thus the radar and sight axes will be swept out and in over the ground, producing range excursions which at times are large because of the small depression angle and low altitude of the aircraft. This will cause both the sighting and the switch operation to be erratic as well as make the range measurement difficult for the radar detection and tracking circuits. There is compensation, however, in the fact that the pilot can attempt to track the target by direct control of the aircraft and, since the point of range measurement is arbitrary, he can choose what appears to be the best time to initiate the switch operation and record the range to the target.

If this procedure should not be entirely satisfactory, another system arrangement can be used in which the antenna and sight axes are space stabilized, that is, made independent of aircraft pitch attitude variations. Here, as in the first system arrangement, the antenna and sight axes are at the requisite depression angle. In this case the pilot cannot execute direct flight control to affect the sighting operation, but neither are the radar and sight axes being swept erratically over the ground. Therefore, the pilot can continue his approach to target without undue care in maintaining level flight, and he can initiate the switch action to record range when the stabilized (undeviated) sight and radar axes fall on the target.

The preselected information provided to the computer is based on tactical considerations. The precalculated time from pull-up to weapon impact is the result of calculations made prior to the take-off of the aircraft and takes into consideration a prespecified pull-up maneuver, a prespecified altitude of approach, a prespecified air speed, and the angle of flight path at which weapons will be released. Wind in the range direction is not considered in these calculations as the computer takes that into account according to the invention.

While the invention has been described in a manner suggestive of a loft bombing attack by piloted aircraft using conventional air-to-ground radar, computer means, and armament control system, it is clear that there are many other conceivable applications and therefore we wish to be limited in scope only by the appended claims.

We claim:

1. In an aircraft, a means of loft delivery of weapons at a target from the aircraft flying at low altitude comprising: an air-to-ground ranging radar carried by said aircraft to produce range voltage representative of the range from said aircraft to a target; a storage circuit coupled to said ranging radar to receive and store, at a selected instant, a range voltage representative of the actual range from said aircraft to said target at said selected instant; a timing generator capable of producing a voltage representing passage of time with respect to an instant of initiating activity; a switching means coupled to said storage circuit and to said timing generator for selecting said instant of storing said actual range voltage and of initiating activity of said timing generator; means separately establishing a direct current voltage respectively representing the air speed of said aircraft, the wind velocity in the direction of flight, the precalculated time required between pull-up of said aircraft from level flight and the impact of weapons at the target, and the preselected range between target and aircraft at time of pull-up during conditions of no wind in the direction of flight; means combining said voltages to produce a first summation voltage of said air speed and wind velocity voltages, a first product voltage of said first summation voltage and the voltage representing the passage of time, a second voltage product of said wind velocity and precalculated time voltages, a second summation voltage of said second voltage product and said preselected range voltage, and a difference voltage of said second summation voltage and said actual range voltage; comparator means coupled to said combining means to receive said difference voltage and said first product voltage to produce, upon the equality thereof, an alerting voltage signal indicative of the correct time for initiation of pull-up of said aircraft; and means activated by said switching means selecting said instant for momentarily sensing the flight path of said aircraft and releasing said weapons at the point in the pull-up flight path to effect weapon-target proximity.

2. In an aircraft, a means of loft delivery of weapons at a target from said aircraft at low altitude comprising: air-to-ground ranging radar to produce a voltage representative of range from the aircraft to a target; a storage circuit coupled to said ranging radar to receive and store, at a selected instant, a range voltage $R_1$ from said radar; a timing generator to produce a voltage $t$ representing passage of time with respect to said instant; switching means coupled to said timing generator and to said storage circuit for selecting said instant; a computer coupled to said storage circuit and to said timing generator, said computer including potentiometers for introducing and establishing direct current voltages representing air speed of the delivery aircraft $V_a$, wind velocity in the direction of flight $\pm W$, precalculated time $t_1$ required between pull-up of said aircraft from level flight and the impact of weapons at the target, and preselected range $R_0$ between target and aircraft at time of pull-up during conditions of no wind in the direction of flight, and means in said computer for combining said voltages from said computer potentiometers with the range and timing generator voltages including a first summing circuit for adding the air speed voltage $V_a$ of said aircraft to the wind velocity voltage $\pm W$ in the direction of flight to obtain a first sum voltage, a first multiplying circuit coupled to said first summing circuit and said timing generator for multiplying said first sum voltage by the voltage $t$ representing the passage of time with respect to said instant to obtain a first voltage product, a second multiplying circuit coupled to the potentiometers for introducing the wind voltage $\pm W$ and the time voltage $t_1$ for multiplying $\pm W$ by $t_1$ to obtain a second voltage product, a second voltage summing circuit coupled to said second voltage multiplying circuit and the potentiometer for introducing the preselected no wind pull-up range voltage $R_0$ for adding said second product voltage to voltage $R_0$ to obtain a second sum voltage, a voltage subtracting circuit coupled to said second voltage summing circuit and to said storage circuit for subtracting said second voltage sum from the range voltage $R_1$ of said storage circuit to obtain a difference voltage, and a comparator circuit coupled to said voltage subtracting circuit and said first voltage multiplying circuit for comparing said voltage difference with said first voltage product to produce an alerting signal upon the occurrence of an equality between said difference and first product voltages indicative of the correct time for initiation of pull-up of said aircraft; and means activated by said switching means selecting said instant for momentarily sensing the flight path of said aircraft and releasing said weapons at the required point in the flight path during pull-up from level flight.

References Cited in the file of this patent

UNITED STATES PATENTS

| | | |
|---|---|---|
| 2,609,729 | Wilkenson et al. | Sept. 9, 1952 |
| 2,736,878 | Boyle | Feb. 28, 1956 |
| 2,805,601 | Morton | Sept. 10, 1957 |
| 2,823,585 | Gray et al. | Feb. 18, 1958 |
| 2,898,809 | Ryan | Aug. 11, 1959 |

OTHER REFERENCES

Popular Mechanics, Over-the-Shoulder Bombing, October 1957, pp. 106 to 109, 298, 300, 302, 304. (Copy in Div. 10.)

Aviation Week, Bombing System Keyed to New Indicator, July 22, 1957, pp. 62, 63, 65 to 67, 69. (Copy in Div. 10.)